Jan. 15, 1935.   P. L. TEA   1,987,763
DEMONSTRATION APPARATUS OF GYROSCOPIC PRINCIPLES
Filed July 30, 1930   2 Sheets-Sheet 1
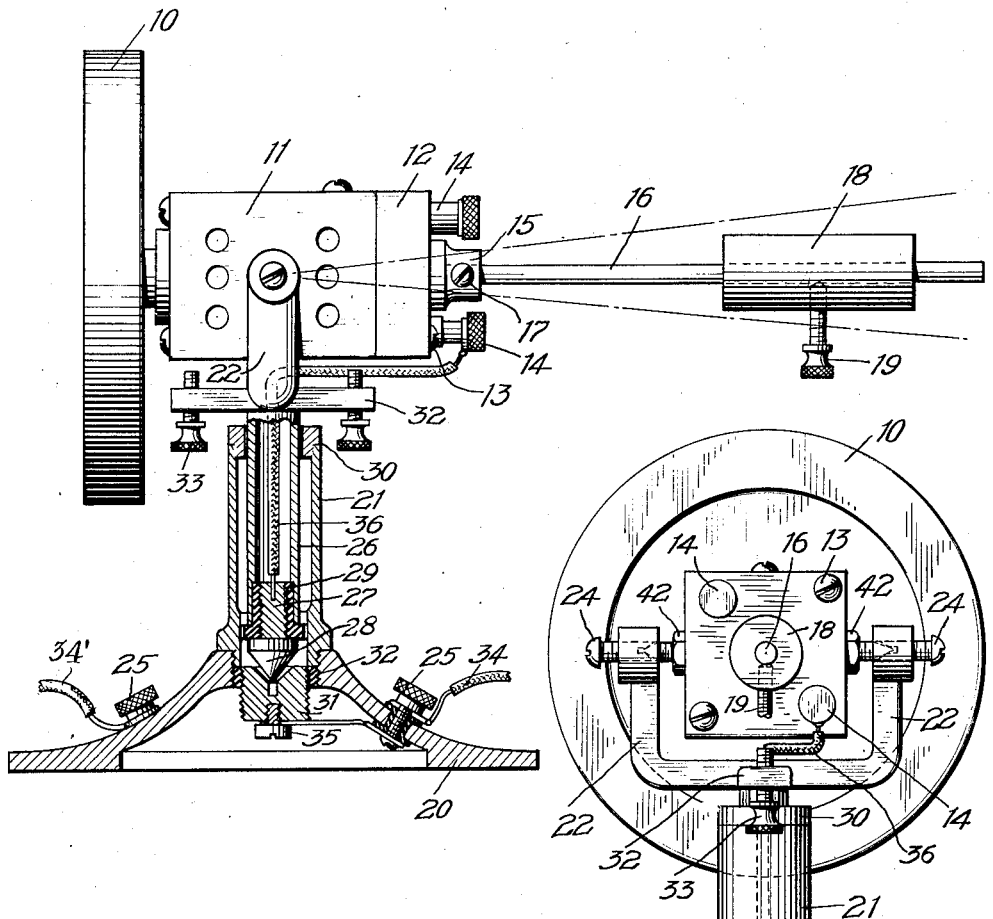
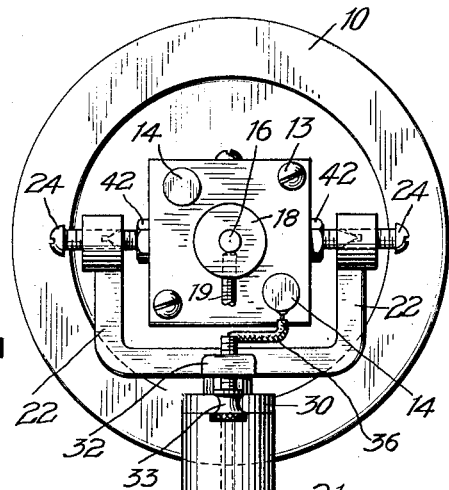
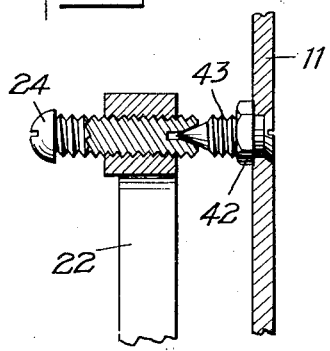
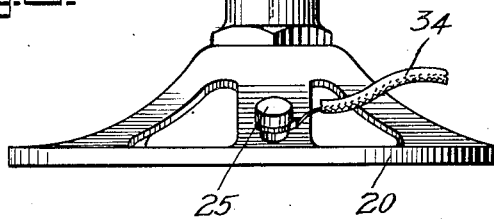
Inventor
Peter L. Tea
By his Attorneys
Kenyon & Kenyon

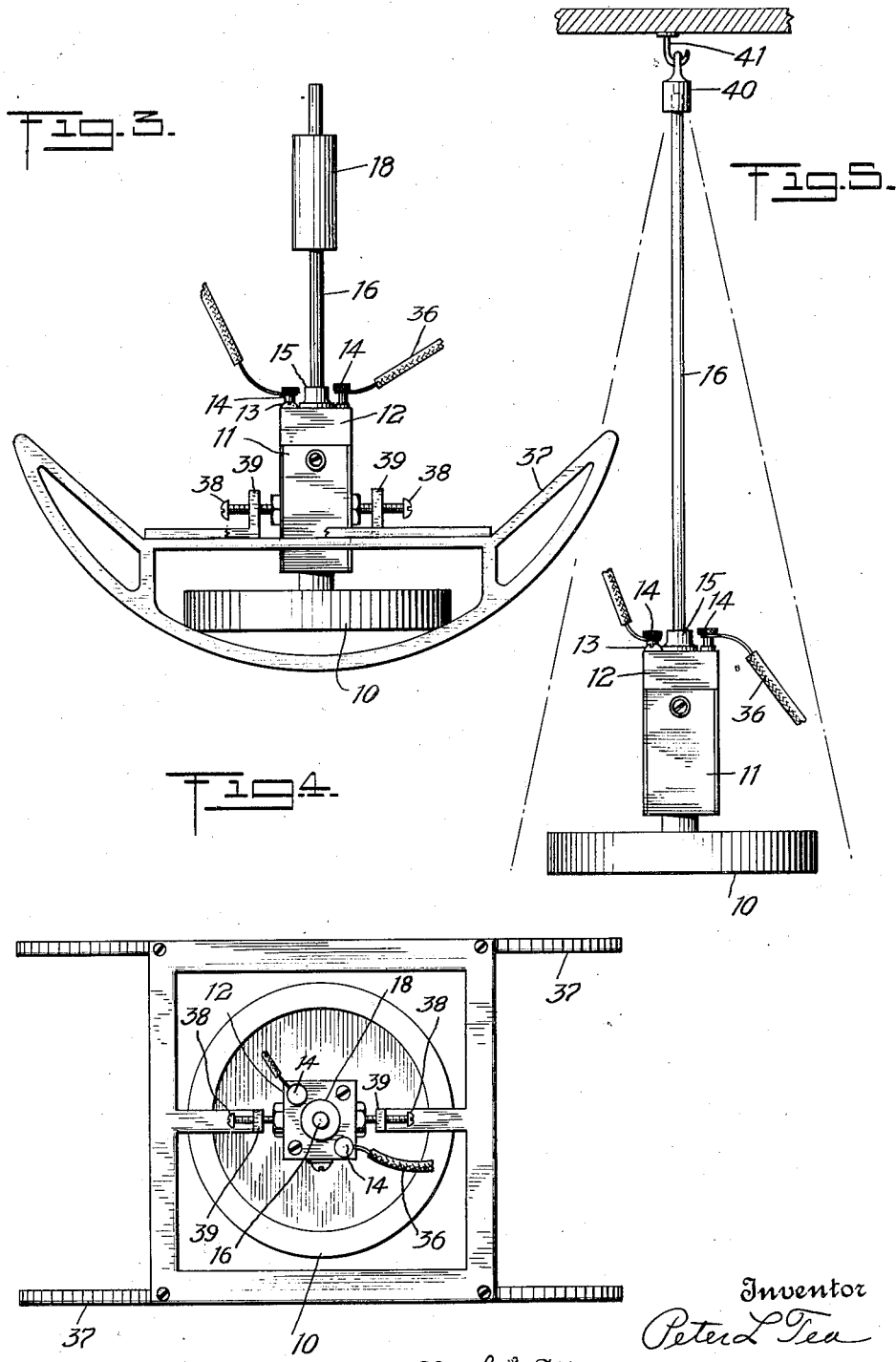

Patented Jan. 15, 1935

1,987,763

UNITED STATES PATENT OFFICE 1,987,763

DEMONSTRATION APPARATUS OF GYROSCOPIC PRINCIPLES

Peter L. Tea, Yonkers, N. Y.

Application July 30, 1930, Serial No. 471,879

5 Claims. (Cl. 35—16)

This invention relates to an apparatus for investigating and demonstrating the principles underlying all gyroscopic motions.

An object of this invention is to provide a simple, efficient and inexpensive apparatus to demonstrate the principles of gyroscopic motions to such, as for instance, a classroom lecture group.

As one embodiment of my invention, we provide a motor driven gyroscope with a pedestal supporting a yoke in which the gyroscope is mounted. Extending rearwardly of the body of the gyroscope there is a fixed rod on which a sliding weight is arranged so that the gyroscope when suspended may be placed in equilibrium or may have a positive or negative torque applied by the simple expedient of shifting the weight on the rod. Inasmuch as we obtain no gyroscopic action in a rotary mass unless we have an applied torque of some nature it may be readily seen that we have provided a simple and efficient means for so doing. Under the influence of a torque my apparatus will precess and may be so manipulated, as will hereinafter be explained, to convincingly demonstrate the fundamental laws of gyroscopic motion. The phenomenon known as nutation or "nodding" may also be observed.

Other features of this invention are that by the employment of two simple attachments we are able to show the effect of a gyroscope when used as a stabilizing force and also the behavior of one when it is hung like a pendulum. Obvious advantages resulting from the concrete impression conveyed to the observer are apparent.

Other objects and advantages will be apparent from the following specification and drawings, in which Fig. 1 is a side elevation of the gyroscope mounted in the yoke-pedestal in cross-section;

Fig. 2 is the rear elevation thereof;

Fig. 3 is an elevation showing the gyroscope mounted in a boat frame attachment for demonstrating stabilizing forces of gyroscope;

Fig. 4 is the plan view thereof, and

Fig. 5 shows the gyroscope in a pendant position.

Fig. 6 is a detail view of the gyroscope's bearing pivots.

The gyroscope proper consists of a rotor or disc 10 rotated by a small motor 11 with a negligible moment of inertia. In this embodiment we prefer to encase the motor 11 in thin metal plates, with ventilation openings, so as to support small conical pivots 43 on which the gyroscope rotates when mounted in either the yoke pedestal or the boat frame attachment.

The rotor 10 is preferably attached to an extension of the motor armature shaft by a set-screw or otherwise in order that it may be removed to ascertain its movement of inertia. Opposite the forward end of the motor 11 we have provided a light metal cap 12, fastened to the motor by machine screws 13. In diagonally opposite corners of cap 12 there are two binding posts 14, one of which is insulated therefrom to prevent a short circuit. Centrally located with respect to and integral with this piece 12 there is a drilled boss 15 into which a rod 16 is inserted. A set screw 17 prevents movement of the rod 16 relative to the cap 12 and motor 11. Arranged on this rod 16 there is a sliding weight 18 whereby different gravitational torques may be applied to the mounted gyroscope. A thumb screw 19 enables one to fix the weight 18 in any desired position along the rod 16.

The yoke-pedestal comprises, in main, a heavy metal base 20, a hollow rigid standard 21 screwed into the base 20 and a swiveling yoke 22 which in turn pivotally supports the gyroscope. Special screws 24, fitted in the ends of the yoke arms, have conical recesses in the bottoms of the screws in which the supporting pivots 43 on the gyroscope rotate. These gyroscope pivots 43 are firmly held in the side plates of motor 11 by some simple expedient such as the one shown in Figure 6, namely, the combination of a countersunk pivot screw 43 and a nut 42 to bind the pivot to the wall of motor 11. The complementary bearing cup 24, mounted in the boss at the end of yoke 22, will by turning adjust the friction in the bearing to any desired amount. Attached to the base 20 are two standard binding posts 25, one of which is insulated therefrom, for the leads from the motor driving force which in this embodiment is a storage battery.

Extending downwards from the yoke 22 and integral therewith depends a hollow rod 26 ending in an enlarged conducting boss 27 and steel point 28. Fiber insulating piece 29 and conductor part 30 align the shaft 26 and prevent undesired current shunting. The steel point 28 rotates in a steel cup 31 screwed into the base 20 and insulated therefrom by ring 32. The yoke 22 has two projecting lugs 32 in which two adjustable stops 33 are mounted. It may readily be seen that the amount of dip of the gyroscope may thereby be limited during a demonstration.

Current to run the motor flows out of the storage battery into a lead 34 whence it is conducted to the steel cup 31 through insulated binding post 25 in the base 20. A contact screw 35 insures contact with the cup 31. A very flexible insulated wire 36 is passed through the rod 26 and one tip is firmly held by boss 27. The other end of lead 36 is attached to the insulated post 14 and the current passes thence into the motor. Motor 11 is grounded so that the current passes through pivot 43, yoke 22, hollow rod 26, conductor piece 30, hollow standard 21, base 20, grounded binding post 25, lead 34' and finally back to the battery, which is not shown. Insulation piece 29, which rotates with rod or spindle 26 and cone point 28, prevents a short circuit between these parts of opposite polarity. Thus it is possible with only one wire lead 36, which rotates with spindle 26, to produce a gyroscope capable of continuous precession and that without the twisting of any wires. The upper terminal post 14 above rod 16 in Fig. 1 is grounded and is not used with the demonstration assembly in Figs. 1 and 2. This terminal post 14 does come into use, however, upon performance of the experiments with the apparatus mounted as shown in Figs. 3 and 5.

In the arrangement shown in Fig. 4, there is provided a rocking frame 37 designed to simulate the rolling motion of a boat at sea. The frame 37 is preferably made of aluminum but it may be of any rigid material and may be either in one piece or built up. Two cup screws 38 mounted in lugs 39, similar in function, construction and position to bearing screws 24—24, support the gyroscope in the rotatable position shown in Fig. 4. To keep this position stable the weight 18 is placed so that the center of gravity of the entire gyroscope lies well below the pivotal supports 38—38.

To convert the gyroscope into a pendulum affair the weight 18 should first be removed from the rod 16, though this is not strictly necessary, and an eye cap piece 40, should be fastened to the outer end of the rod 16 by a cotter pin or threads or in any suitable manner. The entire apparatus merely has then to be hung from a support such as hook 41 to be ready for the demonstration. With the two last attachments leads are run directly to the motor 11 from the battery.

In order that the operation and results to be obtained from the above described apparatus may be made clear, let us go through a simple demonstration. We have the gyroscope mounted on the yoke-pedestal with the motor 11 imparting a constant R. P. M. to the rotor 10. By means of sliding weight 18 we may balance the gyroscope or apply a positive or negative torque thereto as we wish. Let us place the weight 18 in such a position that the rotor tends to swing upwards on its pivots 43. Then grasp the rod 16 and hold it at any angle to the horizontal and if we release it suddenly we shall observe a precession, i. e., a rotation of the entire gyroscope about the axis 26. At the same time there will be evident a "nodding" nutation back and forth on the precessional path of the gyro as it swings about axis 26. Again it will be noticed that the gyro dips slowly in the direction of the torque. This is due to the slight frictional resistance in the vertical bearing 31 and to the resistance of the air to the precession. When we entirely prevented the precession the rod 16 sank due to gravity fall without any regard as to the rotation of the disc 10.

If we retard the precession by e. g. pulling a string attached to the rod, the rod 16 dips rapidly in the direction of the torque; if we hasten the precession the rod 16 moves upward in a direction opposite to the torque. Now we know that when a torque is applied to a rotating mass the axis of the rotating mass tends to align itself with the torque axis, that is fundamental. And since the air resistance to the precession and the friction in axis 26 is in reality a counter-moment about a vertical axis, rod 16 tends to precess in a vertical plane at the same time its end is precessing in a horizontal one. We thus obtain our slight dip and an intermediate precession not entirely in one plane as the rod sinks lower and lower until the stops 33 arrest all further descent. Whereas, in the absence of all friction and air resistance, the precessional rotation would be sufficient to balance the torque and the rod 16 would not sink at the moment of release although the nutation phenomenon would still be with us. The proof that this is so was shown when we pulled the string attached to the rod in different directions and could thereby make the rod sink or rise with any degree of speed at will.

From our observations and the discussion immediately preceding this paragraph, we are enabled to show that the torque and precession axes are interchangeable as for example axis 26 and axis 24—24, since we could turn the gyro on axis 26 suddenly and cause axis 24—24 to be our precession axis. Then any axis may have a combined torque and precessional displacement to produce combined torque and precession in the other axis such as we had when we retarded or hastened the precession during our demonstration. If we wish we may prove the fundamental formula of gyroscopes which is "torque equals moment of inertia of gyroscope rotor times angular speed of rotor times angular speed of precession", by accurately measuring the first three terms and solving for the precessional period. The correctness of the formula may then be determined with a stopwatch measurement as the gyroscope precesses in the demonstration.

With the gyroscope mounted in boat-frame 37 we may observe how the above-mentioned forces act to stabilize a boat and to increase the effective mass. For our purposes now the center of gravity of the gyroscope is below the center line of the pivots 38—38. With the rotor 10 still, if we roll the boat we will obtain the natural period of roll. With the disc rotating the period will increase owing to the increase in effective mass caused by the precession of the gyroscope at right angles to the roll. If there is little or no friction in the bearings 38—38 the gyroscope will swing through nearly 90° and will be ninety degrees out of phase with the roll after all transient conditions have subsided. If all conditions are right we will obtain a resonant state of the gyroscope and boat. Reverse this process: tilt the gyroscope and produce the same state with the boat rolling ninety degrees out of phase with the tilting of the gyroscope.

As for the stabilizing experiment, let us tighten the bearings 38—38 a little so as to introduce friction, i. e., a torque, when the gyroscope precesses. The effect of this friction will be, following our principles, outlined above, to cause a tendency of the gyroscope to precess in the plane of the roll, thus setting up a counter torque to quench the roll of the boat. We can introduce more and more friction until we have the boat in a critically damped state; but too much friction will prevent precession and lose our stabilizing effects. In fact complete prevention of the precession will cause the boat to resume its shorter natural period of roll even though the disc 10 is still rotating.

In the arrangement shown in Fig. 5, the gyroscope is swung and if the rotor 10 is not turning a simple pendulum results, oscillating in a plane defined by the rod 16 at rest and the rod 16 when released from a position oblique to the vertical. Start the motor 11 and we see that we have a variable gravitational torque and a rotating mass so that we obtain a series of festoons in the air as a result of the combined torque and precession effects. The torque and precession axes pass through the hook 41 and their instantaneous positions are determined by many factors such as rotor speed, length of pendulum and frictional effects. If the friction forces are low the nodding or nutations of the gyroscope may be seen as it describes its curves.

The usual graphic exposition of gyroscopic motions and principles involves vectors and a symmetrical rotor such as our disc 10 is used because the rotor speed can be represented by a vector coinciding with the axis of rotation. An asymmetrical rotor cannot be demonstrated in this simple vectorial manner but it is possible that our demonstration apparatus would permit of the use of one because our device is motor driven and the error would be small.

Whereas the above-described apparatus is primarily intended to investigate and demonstrate the aforementioned principles, still it will be apparent, of course, that the invention is not limited to the particular embodiment or the sole uses above described and that various structural changes and different employment may be made by anyone skilled in the art without in any way departing from the spirit of the invention as set forth in the appended claims.

I claim:

1. In a gyroscopic demonstration apparatus, an assembly consisting of a universally supported grounded motor, an independent rotor adapted to be spun at constant speed thereby, and a torque applying means, said universally supporting device comprising a vertical hollow cone bearing adapted to rotate in a complementary cup in the base of a supporting standard, and a single lead from said motor adapted to be contained within said bearing member and insulated from part thereof so that the assembly is capable of continuous rotation with a minimum amount of friction.

2. Demonstration apparatus for classroom use, comprising in combination, a gyroscope rotor, and independent, grounded motor adapted to rotate said rotor and to precess therewith, a swiveling support therefor, a base, and an insulated motor lead adjacent said support adapted to move therewith whereby continuous precession of said rotor is effected.

3. Demonstration apparatus for classroom use, comprising in combination, a gyroscope rotor free to precess about three axes, a grounded motor, a pivotal support for said motor including a yoke, a hollow spindle, a base with an insulated bearing for said spindle and an insulated motor lead contained within said spindle whereby said apparatus may demonstrate continuous precession.

4. Demonstration apparatus for classroom use, comprising in combination, a gyroscope rotor connected to a spinning motor, said motor being universally supported, and means wherein said motor is grounded through one portion of the supporting structure and electrically connected through another and insulated portion of said supporting structure, thereby adapting said apparatus for continuous precession in one direction.

5. Demonstration apparatus for classroom use, comprising in combination, a gyroscope rotor, a separate motor connected to said rotor, universal supporting means for said motor comprising a stationary and a revolvable portion, means for grounding said motor through said stationary portion, and means for electrically insulating and connecting the remaining branch of the motor circuit through said revolvable portion whereby said apparatus may continuously precess in one direction.

PETER L. TEA.